United States Patent [19]

Cowley

[11] Patent Number: 4,781,597
[45] Date of Patent: Nov. 1, 1988

[54] ARTIFICIAL BIRD BODIES FOR TAXIDERMY

[76] Inventor: David M. Cowley, 341 S. Franklin, Ponca City, Okla. 74601

[21] Appl. No.: 142,567

[22] Filed: Jan. 11, 1988

[51] Int. Cl.$^4$ .................. G09B 23/36; A41G 9/00
[52] U.S. Cl. ..................... 434/296; 428/16; 428/542.4; 264/222; 264/227
[58] Field of Search ............ 434/295, 296, 297; 428/16, 542.4; 264/222, 227

[56] References Cited

U.S. PATENT DOCUMENTS

| | | |
|---|---|---|
| 727,435 | 5/1903 | Pietzner . |
| 1,844,592 | 2/1932 | Paladin .................. 434/296 |
| 2,181,452 | 11/1939 | Ford . |
| 2,271,454 | 1/1942 | Erdle et al. . |
| 2,515,017 | 7/1950 | Nicholson . |
| 2,941,277 | 6/1960 | Ganz . |
| 2,982,998 | 5/1961 | Smith et al. . |
| 3,200,515 | 8/1965 | Daigre .................. 434/296 |
| 3,562,049 | 2/1971 | Maher . |
| 4,325,996 | 4/1982 | Krietemeier et al. ........ 428/16 |
| 4,735,752 | 4/1988 | Negethon .............. 434/296 X |

OTHER PUBLICATIONS

The Jonas Technique, vol. One, Bird Mounting, by Joe Kish, dedication page only, ©1976.

Primary Examiner—William H. Grieb
Attorney, Agent, or Firm—William J. Miller

[57] ABSTRACT

This invention relates to an article of manufacture and a method for making same, such as an artificial bird body used in taxidermy and essentially made to represent a plucked bird body using a polyurethane foam casting of the plucked carcass. The final foam casting is made in a two (2) step process. The first step consists of plucking the feathers from a bird so that the skin, muscles, connecting tissue and bones are intact in the bird body. Next, a casting is made using a specific procedure so that the bird is cast in the final pose desired. Special slots are made to insert the tibia and the tail portions of the bird. An additional provision is made for the insertion of a heavy wire for giving structural strength to the bird body and for mounting the neck and/or head of the bird. A second casting is then made of the reconfigured first casting and the second casting used for the final product.

3 Claims, 1 Drawing Sheet

ARTIFICIAL BIRD BODIES FOR TAXIDERMY

DISCUSSION OF THE PRIOR ART

Unlike the mounting of fish, mammals and game head, emphasis in the taxidermy of birds has always been placed on duplicating the skinned out carcass when consideration is given to the artificial body which will be used. Thus, the procedure for the mounting of birds has been to construct or purchase an artificial body which approximates the skinned out carcass of the bird. Once the skin is placed around the artificial body that resembles the skinned out carcass, then stuffing, such as cotton, polyester fiber or other material, is placed between the artificial body and the skin being mounted to the body. However, in order to produce a mount which accurately duplicates the live bird, it is mandatory that the stuffing material be placed in the correct locations and in the correct amounts in order to properly configure the bird muscles, connecting tissue and the like. The general result is a finished bird which is distorted in shape to the eye of the knowledgeable viewer. Another problem with stuffing material between the body and the skin with the feathers attached is the fragility of the dried skin. Skin, once mounted, becomes extremely brittle and can not stand handling since it lacks the support found on other mounted animals such as fish, mammals or game heads.

An additional area where bird taxidermy is unusual is that the mounting process requires the bringing of several structures together within the skin, then bending, twisting and squeezing them in a manner to attempt to produce a lifelike mount. In fish, mammal and game head taxidermy, a rigid form which supports all areas of the skin is sculptured in the pose desired for the finished mount and then the skin is applied to that form. In order to obtain various desired poses, the form or artificial body is altered before the skin is mounted on it. Current techniques for mounting birds allow any pose to be achieved by attaching the skull to the artificial neck and the legs and wings to a crude artificial body and letting the feathers cover for any lack of precision in the artificial body.

The sculpturing of a bird form then takes place from the outside of the mount, the exact opposite of all other phases of modern taxidermy.

BRIEF DESCRIPTION OF THE INVENTION

This invention begins by using a plucked carcass rather than a skinned out carcass. Secondly, the plucked carcass is positioned in the finished pose desired for the bird in a special molding process to be described in a later portion. Once the plucked carcass is cast in a first casting, then the casting is modified to accommodate, first, the insertion of the tibiae of the bird which will have the claws or feet attached thereto. Second, a special slot is provided to accommodate the insertion of the tail feathers. Third, a rigid wire is inserted to support the head or neck and head of the bird. Fourth, the shoulders are modified to facilitate symmetrical and accurate placement of the wings.

Once the modified casting is complete, a second casting is made of this modified casting and the second casting is then used to form the finished bird mount. This second casting will accommodate the tail feathers, the tibiae which will be wired in place and the beak which can be attached by means of a heavy wire. The skin, having the feathers attached thereto, can then be placed over the body and pinned or sewed and the muscle configurations will all be completely accurate along with the connecting tissues for the particular pose of the bird selected. Since all of the skeletal portions of the bird were originally in the casting along with the proper movements of the skeletal frame of the bird into the desired or selected pose for covering, no pose will be unnatural, particularly since joints can not be positioned past their natural movements. The extremely heavy wire will reinforce the neck and the head; since the form will not be repositioned there will be no need to bend the neck wire while mounting and positioning the bird. In the prior art, the wires had to be small enough so that the neck could be repositioned as necessary to obtain the desired posed.

DETAILED DESCRIPTION OF THE INVENTION

Figure 3:
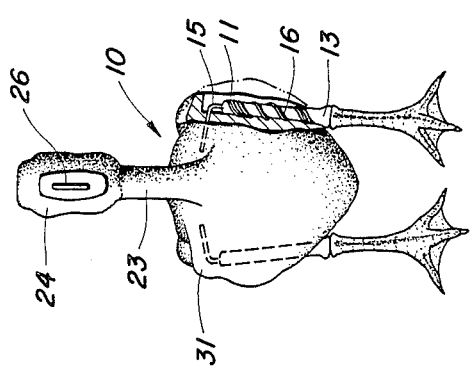
FIG. 3 is an end view of the bird body shown in FIGS. 1 and 2.
Figure 4:
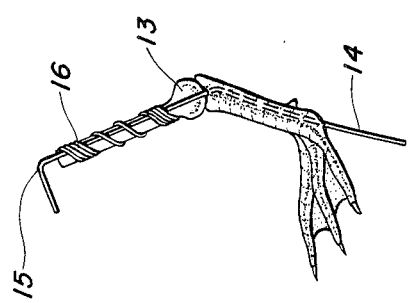
FIG. 4 shows a tibia bone and method for mounting the tibia bone in the bird body illustrated in the previous FIGURES.

Referring to all of the FIGURES, both the article of manufacture and the method for making same will be described. Since the article of manufacture results from the method for making the article of manufacture, the method is described in the following manner.

The first step requires the selection of the desired bird to be mounted; since nearly all ducks, geese, grouse and other birds, when adult, have almost identically the same sized bodies, a specimen can be selected for casting which can function in nearly all birds of the same category and type. Thus, for example, an adult mallard duck body form will function for almost any adult mallard duck desired to be mounted. Once a desired specimen is located, the carcass is stripped of all feathers by plucking. Care is taken to make certain that the skin is not damaged or disrupted and that the bone structure of the bird is intact, that is, it is not broken or damaged in any way. Once the bird has been defeathered, the tarsi are removed resulting in a bird having substantially the appearance of that shown in FIG. 1. A box, at least three-quarters (¾) of an inch larger than the bird body in all directions when in the desired pose, is then selected. The box preferably has a removable bottom and a removable top. Half of the box is then filled with a damp, fine sand and the bird is then, preferably with the ventral side own, inserted into the sand so that half of the bird is immersed into the sand. It is obvious, that the opposie side from the ventral can be inserted into the sand, however, the preferred method is to insert the bird with the ventral side or underside into the sand first.

The desired pose is then accommodated. As an example, the wings can be outstretched, the body can be positioned in a take off position or the body can be positioned in a normal standing position as is that illustrated in FIGS. 1, 2 and 3. Once the proper pose is selected and the bird inserted half way into the sand, as previously discussed, a liquid plaster of paris is poured over the bird body to a thickness of at least three-quarters (¾) of an inch. The plaster of paris is preferably of a creamy consistency and should be carefully poured on top of the plucked carcass. Several layers may be necessary to build up all areas of the mold to at least three-quarters (¾) of an inch. It is obvious that reinforcing members can be placed in the mold if necessary.

When the top half of the mold has hardened, the box is inverted leaving the top of the mold in place and the bottom of the box is opened. The damp sand bedding is then removed, taking care not to disturb the carcass in the top half of the mold. The sand can be removed by carefully spooning the sand, by vacuuming the sand or any other selected method well known in the art. The plucked carcass is now laying in a bed of hardened plaster with the ventral surface protruding. The surface of the bed of plaster is now given a coating of paste wax which will serve as a separator for the two halves of the mold. Once the waxing procedure is completed, thin creamy plaster of paris is again poured over the plucked carcass until sufficient thickness is built up in all areas of the mold.

When the bottom half of the mold hardens, the two halves are pried apart. The plucked carcass is removed from the plaster mold and the mold is allowed to cool. Once the mold has cooled, the mold is then prepared for casting by providing outlets for trapped gas and an inlet for injecting the molding or casting compound. Once the mold has been properly completed, it is coated with two coats of shellac to seal the plaster of paris from the casting material. The shellac is then given a coat of paste wax which will again act as a separator. The two halves of the mold are then clamped together and expanding polyurethane foam is mixed and poured or forced into the mold. When the foam has expanded and hardened, the two halves of the mold are pried apart and the casting is removed from the mold. Minor sanding is required to remove the casting lines and any corrections to the shape through casting errors are corrected through the use of clay, such as modeling clay. Two slots are then aligned with the original tibia bone locations. These slots are made of a size and dimension to receive the tibia bone and leg wires. The tail slot is also cut. Adjustments are then made, as necessary, to the shoulders of the casting, to accommodate accurate placement of the wings and symmetry of the area.

A fresh bird specimen is then obtained, skinned and prepared using the normal taxidermy techniques for mounting. The new bird skin is mounted on the casting and analyzed for inaccuracies. Once the causes of any inaccuracies are determined, the mount is disassembled and further modifications are made to the artificial body. Usually this involves a slight change in the depth or angle of the tibia slots or a change in the positioning of the head/neck portion.

The skin is then remounted on the altered form and adjustments are made until the final bird body accepts the skin and the bird has all of the natural musculature in the correct and proper locations.

Figure 1:
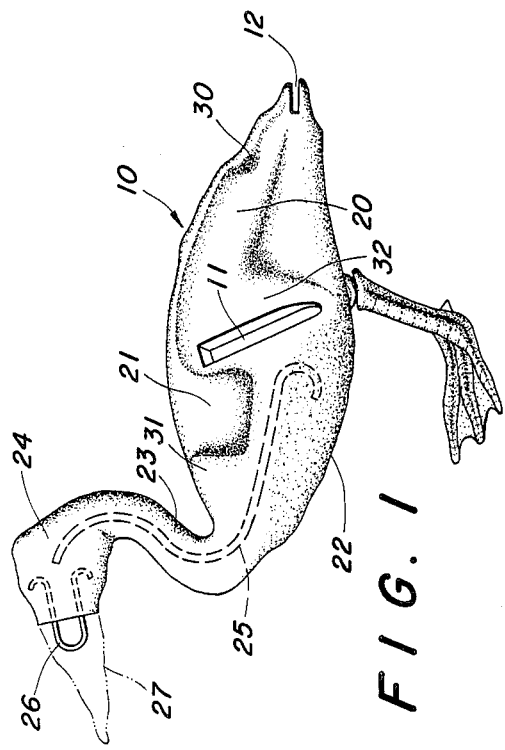
FIG. 1 is a side view of the final casting of the bird body.

Referring to FIG. 1, the casting now resembles a bird body 10 which has a pair of tibiae slots 11 cut therein and a tail slot 12. Tail slot 12 is cut into the casting to receive the tail feather roots 29. The tibia bones will later be wired and inserted into tibia bone slots 11 by taking a tibia bone 13, placing a wire 14 along its length which has a bend 15 at its end. Wire 16 is then wrapped around leg wire 14 and tibia bone 13 in a manner to securely attached wire 14 to tibia bone 13. Tibia bone 13 is then pressed into slot 11 and wire 14 is inserted into the foam plastic body in a manner to securely anchor tibia bone 13 to the body of the bird.

Once the bird body is properly constructed, the same steps are followed to make a new final cast body. Using the same apparatus for making the first casting, a second casting is now made. The only difference is that the mold is now preferably divided vertically rather than horizontally as in the original mold. Once the mold for the second casting is complete and before the mold is sealed with shellac, channels are cut into it that will position support wires which can be cast into the finished bird body. The exact shape and location will vary with the position of the bird. Occasionally small channels will be needed to hold support pins which are positioned in the main internal structure. Support pins may be withdrawn after the foam has hardened.

To make a body, once the mold of the modified casting has been made, heavy structural support wires are shaped to be contained within the casting and held into place with the channels in the mold. The mold is then clamped together in the usual manner locking the support wires in place. Two part polyurethane foam is then again poured into the mold and allowed to expand and harden. The casing is then removed from the mold, support pins, if any, are withdrawn and the seams are sanded smooth.

The article of manufacture, once complete, comprises a bird body 10 having nearly the exact muscular structure of the bird without its skin and feathers. It essentially comprises the skin of the bird, the muscles of the bird, the bone structures underneath the muscles, the connecting tissues, the fat and other things normally present in a bird of the particular type to be prepared. The article of manufacture also contains an exact method for attaching the tibia so that the bird will have a natural pose once the tibia bone is attached. Furthermore, it has a method for absolutely providing a proper location and anchor for the tail feathers for the bird through slot 12.

Referring in particular to FIG. 1, body 10 illustrates the completed body having the muscular tone of an upper thigh 20, tibia muscles 32, indented portions 21 and 30, an exact structure of breast 22, the proper configuration of a neck 23, head portion 24 and shoulders 31. Furthermore, a heavy support wire 25 is properly positioned inside the neck and gives the neck substantial support, particularly since the expanded foam has little or no resistance against fracturing. The real bill of bird 27 or an artificial bill can be easily attached by another support wire 26 which is attached into head portion 24.

Figure 2:
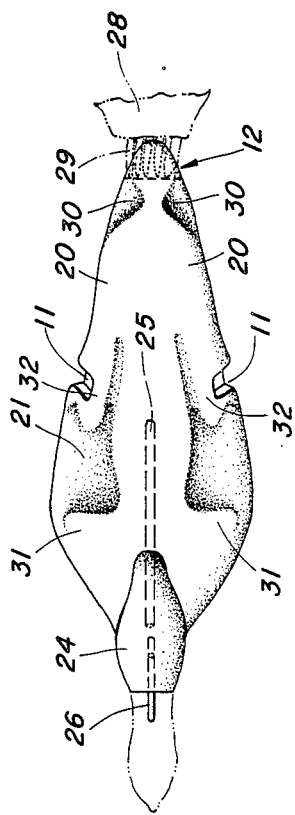
FIG. 2 is a top view of the bird body shown in FIG. 1.

Referring to FIG. 2, it can be illustrated that tail feathers 28 and their ends 29 can be inserted into slot 12.

The particular body structure shown in FIGS. 1 through 3 illustrates the standing duck. Other configurations are equally applicable to the method of casting and the final product. Such other poses could be a flying duck, a duck standing on one foot, or both feet, or any other natural position of the duck. In effect, any natural position of the duck or any other bird can be configured and the plucked body can be positioned in the sand in accordance with the actual bone structure. That is, the bones still being within the plucked bird carcass will assume a natural pose with the proper locations for the various joints, nor will joints be made to assume unnatural positions since the actual bones themselves can not be placed in unnatural positions. In view of the above, in all cases, proper representation will be made for the bird in the particular pose desired by the taxidermist.

It is obvious that other modifications, such as the mold having more than two parts, and changes can be made and still be well within the spirit and scope of this invention as described in the specification and appended claims.

What I claim is:

1. The method of manufacturing an artificial bird body for covering with skin and feathers comprising:
   (a) plucking all the feathers from a bird carcass;
   (b) filling one-half (½) of a box with granular material;
   (c) positioning one-half (½) of said bird in said granular material in a selected pose for mounting;
   (d) filling a portion of the remaining one-half (½) of said box with molding materials to form a first half of a mold; said mold formed on a plane taken substantially horizontally through said plucked carcass;
   (e) removing said granular material and filling a portion of said box which contained said granular material with said molding material to form a second half of said mold;
   (f) removing said carcass from said first and second halves of said mold;
   (g) filling the space occupied by said bird carcass with molding material to form a first cast carcass then removing said first cast carcass material, when solidified, from said first and second half molds;
   (h) adjusting the shape of said first cast carcass to properly fit a skin with feathers;
   (i) forming a pair of slots to receive a pair of tibia bones and a third slot to receive a tail portion; and,
   (j) forming a second casting using steps (b) through (g), using said first cast carcass, said first and second halves of said second casting parting along a vertical plane through said first cast carcass, including the insertion of support wire means,
whereby a bird body in any normal pose can be cast which includes all of the bones, muscles and connecting tissues in its proper location for the placement of skin and feathers thereover.

2. Method as claimed in claim 1 wherein said first and second castings are made using rigid polyurethane foam.

3. An article of manufacture comprising:
   (a) a rigid polyurethane foam casting of the body of a bird, said body having a first and second tibia, muscle portion, tail feather portion, neck portion, shoulder portion and head portion, casting from a plucked carcass of said bird, said casting further cast in the desired pose of said bird;
   (b) first and second slots formed in said first and second tibia and muscle portions, respectively, for receiving a tibia bone of said bird;
   (c) a third slot formed in said tail portion for receiving said tail feather portion of said bird; and,
   (d) an elongated wire means extending axially along said neck portion and said head portion for anchoring said head portion of said bird,
whereby said tibia bones including the feed connected to said tibia of said bird can be anchored into said tibia slots, the skin and feathers can be placed and anchored around said cast body, the tail feathers anchored into said slot in said tail portion and a head attached to said elongated wire means, all to form a complete replica of a bird with the proper placement of muscles, fat, connecting tissues and body parts.

* * * * *